United States Patent [19]

Harrison et al.

[11] Patent Number: 4,779,222

[45] Date of Patent: Oct. 18, 1988

[54] LASER DOPPLER VELOCIMETER MULTIPLEXER INTERFACE FOR SIMULTANEOUS MEASURED EVENTS

[75] Inventors: Dean R. Harrison; James L. Brown, both of Sunnyvale, Calif.

[73] Assignee: The United States of America as represented by the Administrator of the National Aeronautics and Space Administration, Washington, D.C.

[21] Appl. No.: 725,714

[22] Filed: Apr. 22, 1985

[51] Int. Cl.[4] .......................... G06D 3/00; G01P 3/36
[52] U.S. Cl. .................................. 364/900; 356/28.5; 342/195
[58] Field of Search ................ 342/195, 162; 364/456, 364/900 MS File, 200 MS File; 356/28.5

[56] References Cited

U.S. PATENT DOCUMENTS

| | | | |
|---|---|---|---|
| 3,307,184 | 2/1967 | Poterack et al. | 342/195 |
| 3,646,554 | 2/1972 | Fierston | 342/195 |
| 3,887,918 | 6/1975 | Bailey | 342/195 |
| 4,071,887 | 1/1978 | Daly | 364/900 |
| 4,075,691 | 2/1978 | Davis et al. | 364/200 |
| 4,090,248 | 5/1978 | Swanson | 364/900 X |
| 4,159,532 | 6/1979 | Getson et al. | 364/900 |
| 4,161,777 | 7/1979 | Ying | 364/200 |
| 4,188,617 | 2/1980 | Fauchier | 364/900 |
| 4,425,643 | 1/1984 | Chapman et al. | 371/20 |
| 4,434,488 | 2/1984 | Palmquist et al. | 371/15 |

Primary Examiner—Gary V. Harkcom
Assistant Examiner—Lawrence E. Anderson
Attorney, Agent, or Firm—Darrell G. Brekke; John R. Manning; Charles E. B. Glenn

[57] ABSTRACT

An Laser Doppler Velocimeter multiplexer interface (20) includes an event pulse synchronizer (162), which synchronizes data pulses from events A, B and C. Clock control (164) is connected to receive timing information on the data pulses from the synchronizer (162). Displays (24, 26, 28) are connected to receive clock signals from the clock control (164) for indicating a data rate for each of the measured events A, B and C. Display (30) is connected to receive clock signals from the clock control (164) to indicate a coincidence rate between data pulses for any selected combination of the measured events A, B and C. A multiplexer (156) receives the data pulses from the events A, B and C and rate data from the clock control (164). Multiplexer (156) has output (180) for supplying the data pulses and rate data to a single input of a data processing system. A multiplexer control (158) is connected to supply control signals to the multiplexer (156) for selecting the event data pulses and the rate data for output from the multiplexer (156). Multiplexer control (158) receives start signals from the pulse synchronizer (162) and user selected inputs for desired outputs from multiplexer (156).

8 Claims, 10 Drawing Sheets

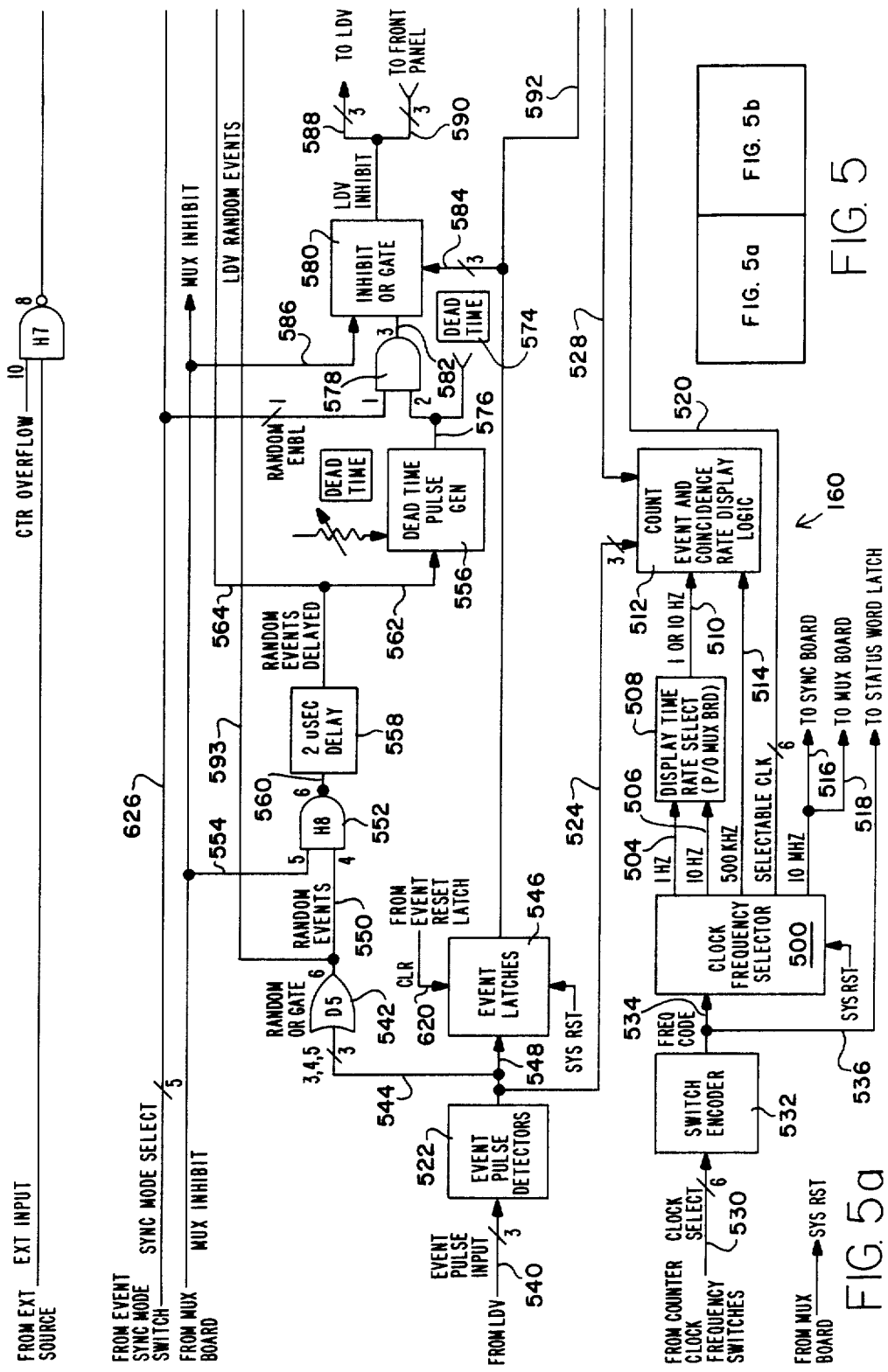

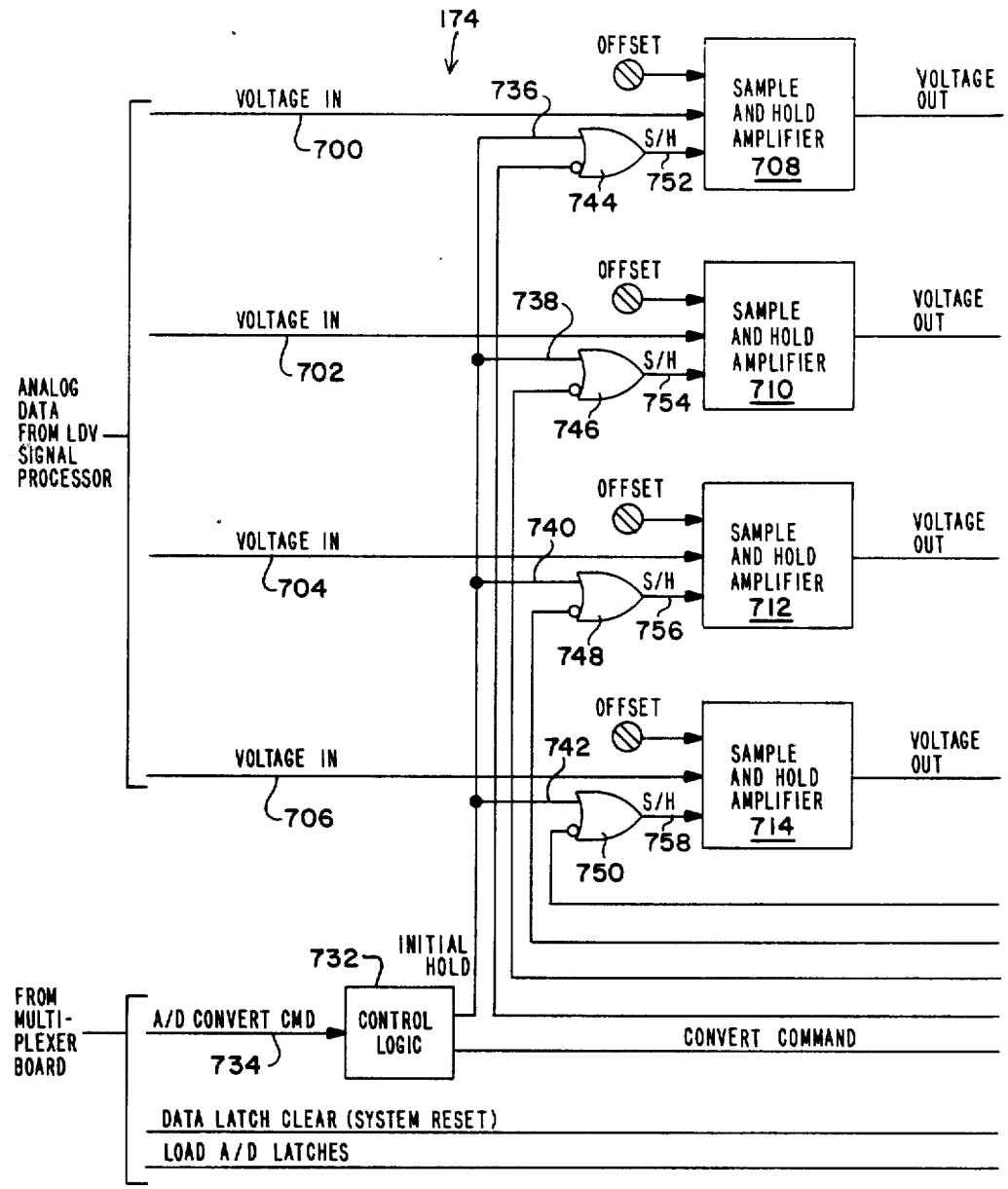
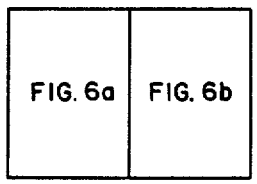
FIG. 6a
FIG. 6

LASER DOPPLER VELOCIMETER MULTIPLEXER INTERFACE FOR SIMULTANEOUS MEASURED EVENTS

ORIGIN OF THE INVENTION

The invention described herein was made by an employee of the U.S. Government and may be manufactured and used by the Government for governmental purposes without the payment of any royalties thereon or therefor

BACKGROUND OF THE INVENTION

1. Field of the Invention

This invention relates to a high speed multiplexer interface for connecting a laser Doppler velocimeter (LDV) or other apparatus providing a number of data channels in different formats at high data rates to a data processing system. More particularly, it relates to such an interface which is capable of receiving randomly occurring data at a very high rate and providing the data to the data processing system in a variety of formats.

2. Description of the Prior Art

LDVs have proven to be very valuable tools for measuring velocity characteristics of moving fluids, particularly for measuring air flow around airfoils and similar structures in wind tunnels. The basic principle of operation is that coherent laser light scattered from particulate matter in a fluid moving with a particular velocity will be Doppler shifted by an amount determined by the laser wavelength. In particular, an LDV system measures flow velocity by splitting a coherent light beam from a laser and then directing the resulting two beams to cross at the point where the velocity is to be measured. The crossed beams establish an interference pattern (fringes) in a very minute volume. The spacing of the fringes can be determined accurately from the relative angle between the beams and the wavelength of the laser beam. When the fringe volume is penetrated by a small particulate matter moving at the velocity of the wind tunnel flow, periodic light is reflected off the particle each time it crosses a fringe. This periodic burst of light can be detected by a photomultiplier tube. The resulting RF signal burst can then be processed by an LDV signal processor, which provides a digitized value of the RF period or the time of crossing between two fringes. With the fringe spacing known, and by measuring the signal period, the particle velocity can be computed. It is often desirable to measure different LDV parameters simultaneously to give a more complete description of the fluid flowfield being studied. Because of the high data rates generated by LDVs and the amount of signal processing of the LDV data required to characterize the fluid flow, LDVs place rather severe demands on data processing systems to which they are connected and to data interfaces between the LDVs and the data processing systems. LDVs are described, for example, in the following issued U.S. Patents U.S. Pat. No. 3,860,342, issued Jan. 14, 1975 to Orloff et al.; U.S. Pat. No. 3,895,872, issued July 22, 1975 to Dandliker et al.; U.S. Pat. No. 3,897,152, issued July 29, 1975 to Farmer et al; U.S. Pat. No. 4,063,814, issued Dec. 20, 1977 to Rhodes; U.S. Pat. No. 4,148,585, issued Apr. 10, 1979 to Bargeron et al.; U.S. Pat. No. 4,167,329, issued Sept. 11, 1979 to Jelalian et al. and U.S. Pat. No. 4,346,990, issued Aug. 31, 1982 to Rhodes. The state of the art in LDVs is further indicated in Durst et al., "Influence of Gaussian Beam Properties on Laser Doppler Signals", Applied Optics, 18, No. 4, pp. 516–524, Feb. 15, 1979.

LDV multiplexer interfaces are commercially available under the designations Models 1998D-1 and 1998H-1 from TSI, Inc., St. Paul, Minn. These interfaces will output real time between LDV events, relative time between LDV events referenced to some external source, synchronize outputs from up to four counters, and serve to connect an LDV to a Digital Equipment Corporation PDP-11 minicomputer. However, these interfaces do not output event status in random mode, do not provide outputs for allowing convenient user selection of output clock frequency, are limited in the number of words that can be multiplexed to the computer, do not provide analog outputs, whether synchronized or not, do not provide a way for the user to keep track of elapsed time, and do not provide an indication of LDV event rate to the user. These interfaces also have a handshake logic which inhibits the rate of data transfer to the computer, are limited to use with one type of computer, and do not allow operation of the interface with signal processors included in the interface in an inhibited mode. These are all characteristics which cause problems for users of these commercially available LDV event multiplexer interfaces.

A variety of other multiplexer interfaces and related systems are also known in the art. For example, the following issued U.S. Patents relate to such interfaces and related systems: U.S. Pat. No. 4,071,887, issued Jan. 31, 1978 to Daly et al; U.S. Pat. No. 4,090,248, issued May 16, 1978 to Swanson et al; U.S. Pat. No. 4,159,532, issued June 26, 1979 to Getson et al; U.S. Pat. No. 4,161,77, issued July 17, 1979; U.S Pat. No. 4,188,617, issued Feb. 20, 1980 to Fauchier and U.S. Pat. No. 4,434,488, issued Feb. 28, 1984 to Palmquist et al. However, the systems described in these patents are not designed for supplying LDV data to a data processing system, and they are therefore not capable of overcoming the above limitations of prior art multiplexer interfaces designed for that purpose.

SUMMARY OF THE INVENTION

Accordingly, it is an object of this invention to provide a multiplexer interface which outputs status of randomly occurring LDV events or other signal inputs to the interface to enable the user to identify which events took place or which sources are providing signals.

It is another object of the invention to provide a multiplexer interface which provides an output identifying a user variable clock frequency of a time interval counter.

It is a further object of the invention to provide such a multiplexer interface which permits user selection of the time interval counter clock frequency from a front panel of the interface.

It is still another object of the invention to provide a multiplexer interface which gives an indication to the user that a change in clock frequency is desirable for optimum resolution.

It is yet another object of the invention to provide such an LDV multiplexer interface which will multiplex a user selectable increased number of data words into a single computer port.

It is a still further object of the invention to provide such a multiplexer interface capable of supplying a plurality of analog measurements at a high speed.

It is another object of the invention to provide such a multiplexer interface which will convert such analog measurements to digital form, synchronized with the occurrence of a measured event.

It is still another object of the invention to provide a multiplexer interface with indications of a plurality of event rates and an indication of event rates for any combination of synchronized ones of the plurality of events.

It is yet another object of the invention to provide a multiplexer interface having an improved handshake logic with a data processing system, which minimizes transfer time and release of a bus of the data processing system.

It is a still further object of the invention to provide such a multiplexer interface which is functionally compatible with more than one type of minicomputer.

It is a further object of the invention to provide a multiplexer interface for supplying data from a plurality of events that allows the user to prevent one signal processor in the interface from recycling from one event while the interface is waiting for signals from another event on another signal processor.

It is still another object of the invention to provide such a multiplexer interface in which the inhibit function also holds the outputs of each signal processor steady while multiplexing is taking place.

The attainment of these and related objects may be achieved with the novel multiplexer interface for LDV and similar applications herein disclosed. A multiplexer interface in accordance with this invention includes a means for synchronizing data pulses from a plurality of measured events. A clock control means is connected to receive timing information on the data pulses from the synchronizing means. A first display means for each of the plurality of measured events is connected to receive clock signals from the clock control means for indicating a data rate for each of the measured events. A second display means is connected to receive clock signals from the clock control means to indicate a coincidence rate between data pulses for a selected pair of the measured events. A multiplexer is connected to receive the data pulses from the plurality of events and rate data from the clock control means. The multiplexer has an output for supplying the data pulses to a single input of a data processing system. A control means for the multiplexer is connected to supply control signals to the multiplexer for selecting the event data pulses for output from the multiplexing means The multiplexer control means is connected to receive start signals from the data pulse synchronizing means and user selected inputs for desired outputs from the multiplexer.

In another aspect of the invention, a time interval counter is connected to receive control signals from the clock control means and a third display means is connected to indicate overflow of the time interval counter. The time interval counter is connected to supply time data pulses to the multiplexer. The clock control means is connected to supply a user selectable clock frequency to the time interval counter.

In a further aspect of the invention, a status word latch is connected to receive measured event status signals from the synchronizing means. The status word latch is connected to supply status data pulses to the multiplexer In still another aspect of the invention, an analog to digital converter having a plurality of channels for receiving measured event analog dignals is connected to supply digitized analog signal pulses to the multiplexer.

In a still further aspect of the invention, the synchronizing means is connected to supply an enabling signal to an event measuring means. The multiplexer control means is connected to supply an inhibit signal to the event measuring means. The synchronizing means is connected to supply an inhibit signal to the multiplexer control means.

A multiplexer interface in accordance with this invention allows increased multiplexing flexibility for supplying data on measured events, either digital in form or analog form converted to digital, to a data processing system. Increased information is provided to a user of the multiplexer interface, allowing better user control of selectable operating parameters. The increased information can also be used for adjusting the event measuring apparatus The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 5 is a key showing placement of FIGS. 5a and 5b.

FIGS. 5a and 5b are a more detailed diagram of a portion of the multiplexer interface shown in FIGS. 3a and 3b.

FIG. 6 is a key showing placement of FIGS. 6a and 6b.

FIGS. 6a and 6b are a more detailed block diagram of another portion of the multiplexer interface shown in FIGS. 3a and 3b.

DETAILED DESCRIPTION OF THE INVENTION

Figure 1:
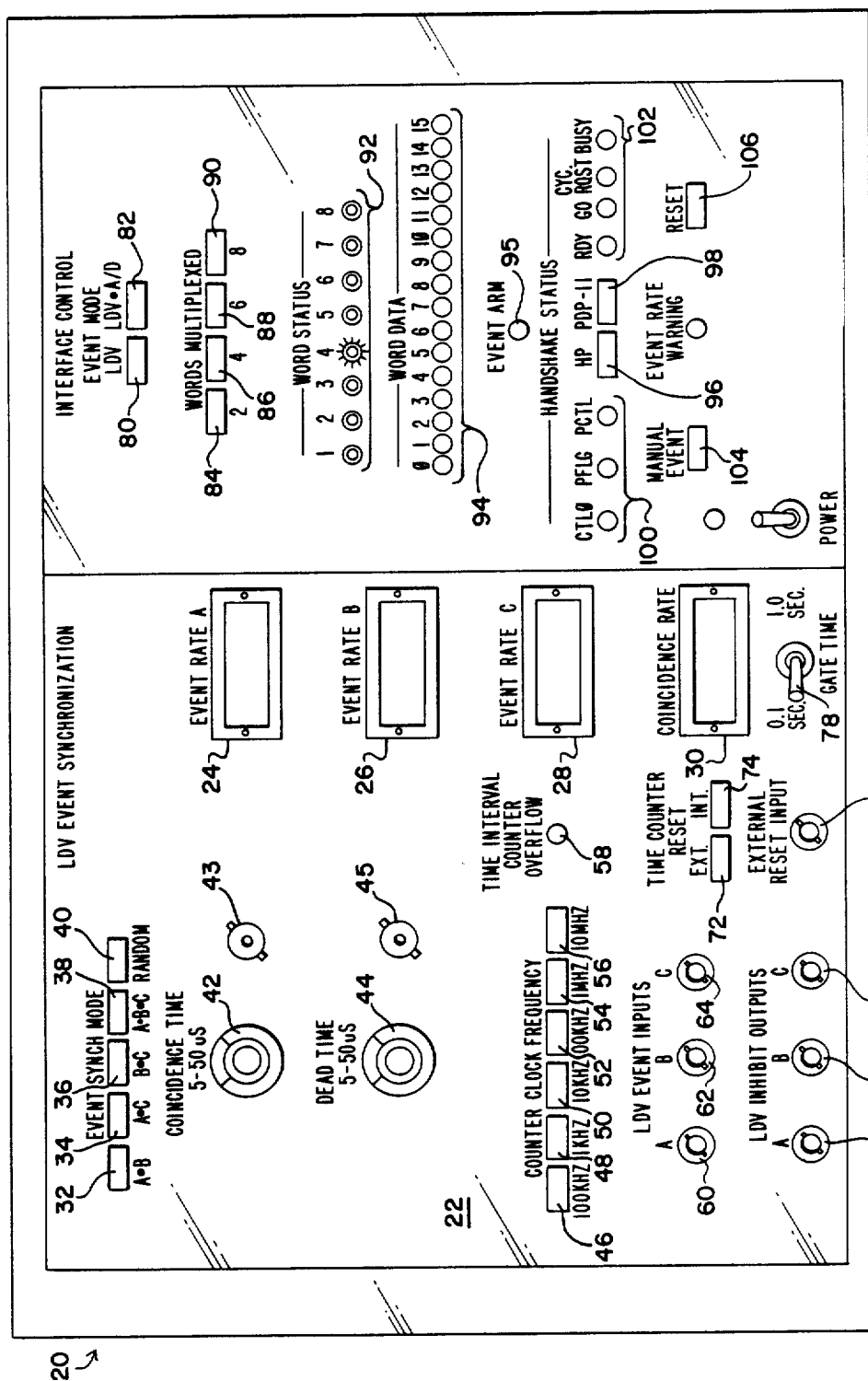
FIG. 1 is an external, front view of a multiplexer interface in accordance with the invention.

Turning now to the drawings, more particularly to FIG. 1, there is shown an LDV multiplexer interface 20 in accordance with the invention. Front panel 22 of the multiplexer interface 20 includes six-digit displays 24, 26 and 28 for indicating the pulse rate of data for different LDV events A, B and C. A fourth six-digit display 30 indicates coincidence rates among various of the events A, B and C, depending on the mode selected. Buttons 32, 34, 36, 38 and 40 allow user selection of the events A, B and C to be synchronized, i.e., the pulses of which events occurring within a user defined time interval should be provided as related event outputs, or a random mode of operation. Knobs 42 and 44 respectively allow choice of a coincidence time interval and a dead time interval. Jacks 43 and 45 respectively provide outputs of the user selected coincidence time and dead time intervals. Buttons 46, 48, 50, 52, 54 and 56 allow user selection of a counter clock frequency by order of magnitude between 100 Hz and 10 MHz. LED 58 is a time interval counter overflow indicator, useful for user selection of the counter clock frequency with buttons 46 through 56. Jacks 60, 62 and 64 provide three channels of LDV event data A, B and C inputs, respectively, from an LDV event measuring apparatus. Jacks 66, 68 and 70 respectively provide LDV inhibit outputs from the multiplexer interface 20 to the three A, B and C channels of the LDV event measuring apparatus, used when the interface 20 is transmitting data to a data processing system. Buttons 72 and 74 respectively allow selection of an external time counter reset or an internal time counter reset. Jack 76 provides the external reset input to the multiplexer interface 20. Switch 78 allows user selection of a 0.1 or a 1.0 second LDV event gate time. Buttons 80 and 82 respectively allow a choice between a mode of operation for the interface in which all digital LDV event data pulses are supplied or a mode in which a combination of digital pulses and analog signals, which must be converted to digital signals, are supplied to the interface 20. The interface 20 provides the ability to synchronize the analog conversion to LDV events. Buttons 84, 86, 88 and 90 respectively allow user selection of 2, 4, 6 or 8 words to be multiplexed in operation of the interface 20. LEDs 92 indicate the status of each word, i.e., which word is being transmitted. LEDs 94 indicate the value of each bit in the word being transmitted. Buttons 96 and 98 respectively allow user selection between the handshake protocol for Hewlett Packard computers, i.e., the HP-9800 series, the HP-200 series, the HP-1000 series, and the HP-multiprogrammer, and the DEC PDP-11/34 and PDP-11/44 minicomputers. LEDs 100 indicate the handshake status for the HP protocol and LEDs 102 indicate the handshake status for the PDP-11 handshake protocol. Button 104 allows selection of a manual event for input to the interface 20, and button 106 is a system reset for the interface 20.

Figure 2:
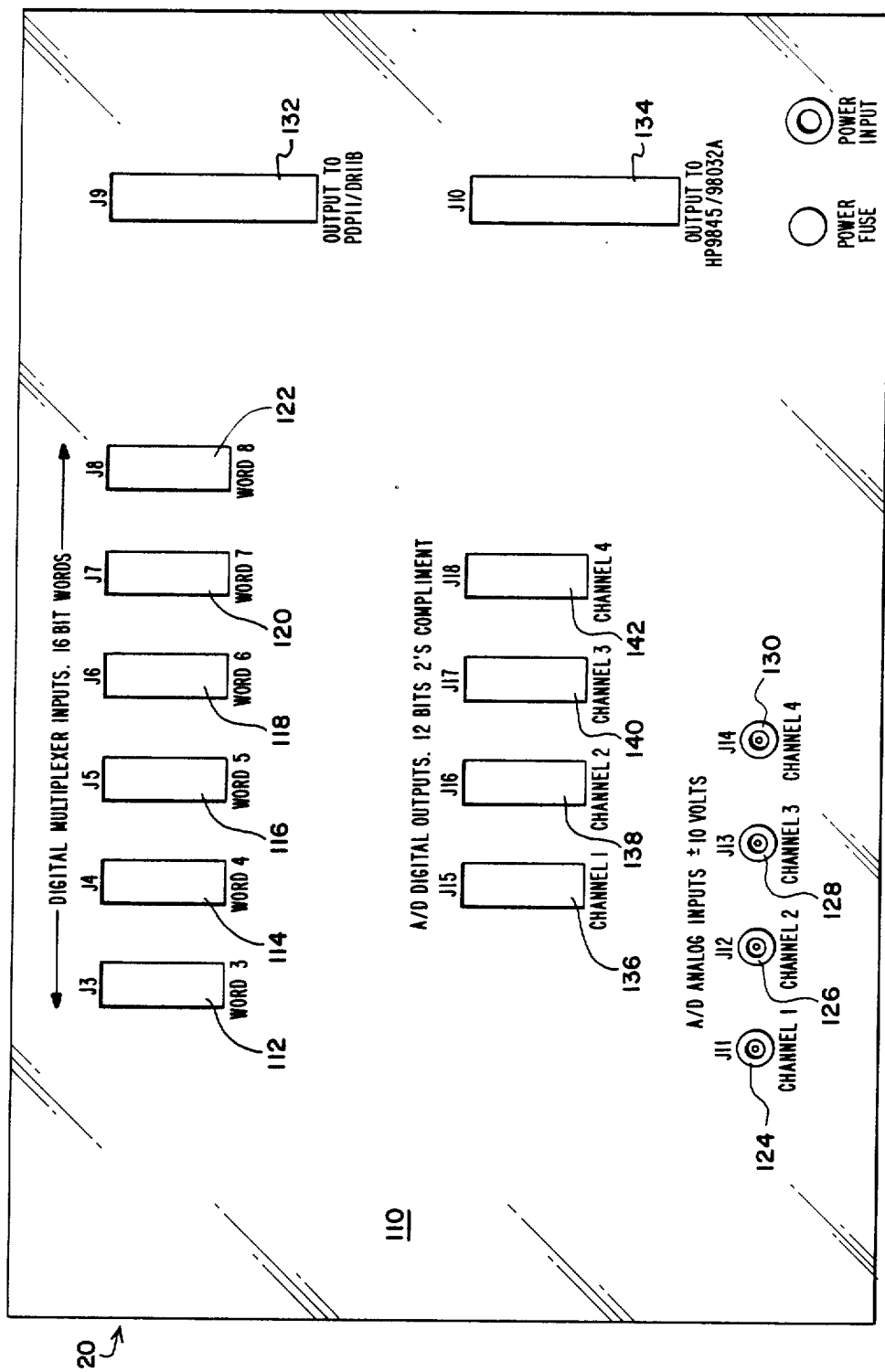
FIG. 2 is a rear view of the multiplexer interface shown in FIG. 1.

FIG. 2 shows back panel 110 of the interface 20. Connectors 112, 114, 116, 118, 120 and 122 allow input of up to six different 16-bit digital words from an LDV event signal processor. Jacks 124, 126, 128 and 130 allow input of up to four different analog signals from any of a variety of analog type sensors. Connector 132 provides multiplexed output of the signals supplied on connectors 112-122 and digitized information corresponding to the analog signals supplied on jacks 124-130 to a PDP-11 minicomputer. Connector 134 similarly supplies the multiplexed signals to a Hewlett Packard minicomputer. Connectors 136, 138, 140 and 142 also provide separate outputs of the digitized analog signals which can be jumpered to the digital input jacks 112 to 122, if desired.

Figure 3A:
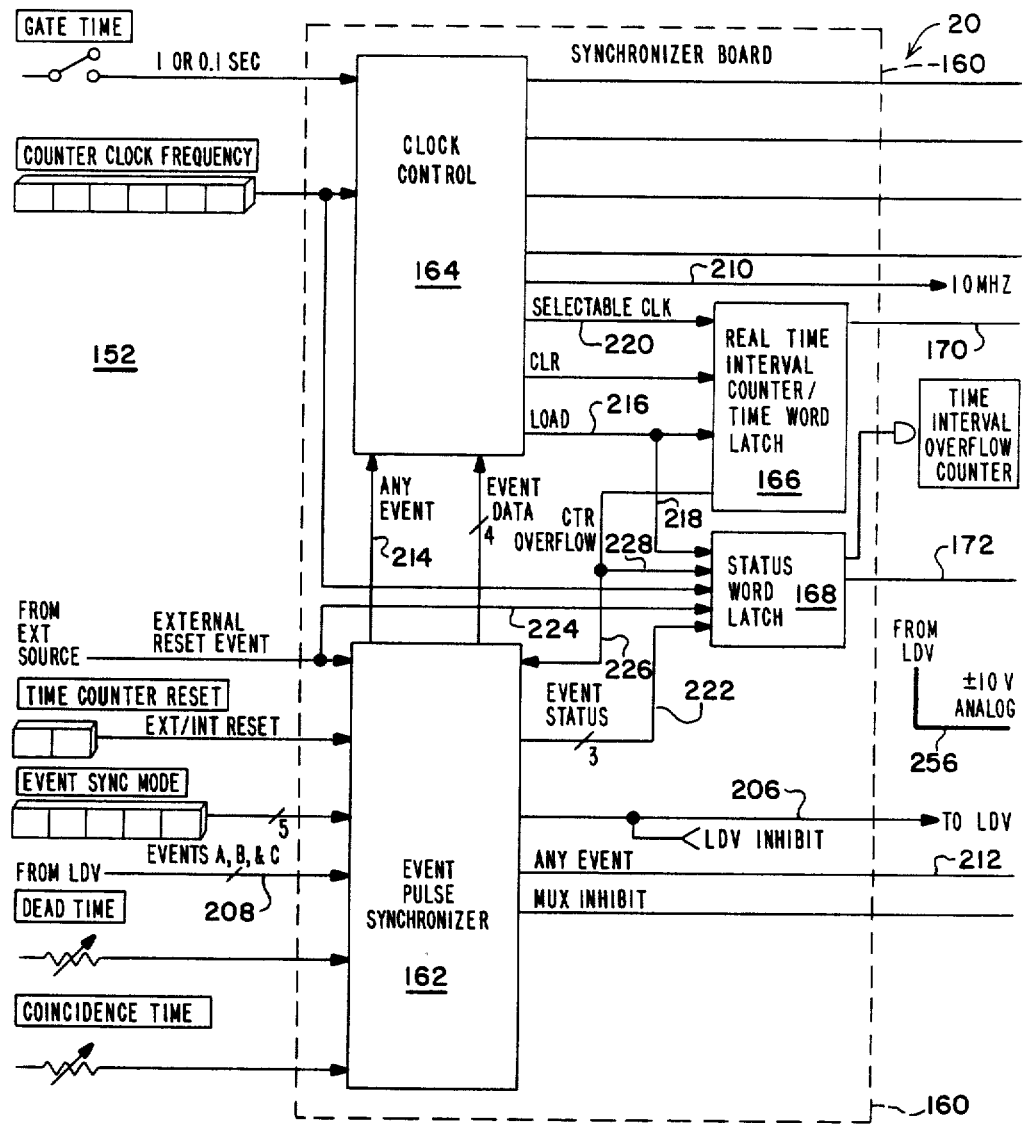
FIGS. 3a and 3b are a block diagram of the multiplexer interface shown in FIGS. 1 and 2.
Figure 3:
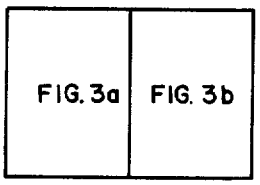
FIG. 3 is a key showing placement of FIGS. 3a and 3b.
Figure 4:
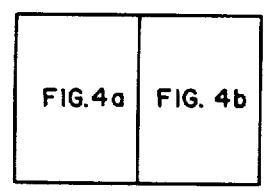
FIG. 4 is a key showing placement of FIGS. 4a and 4b.
Figure 3B:
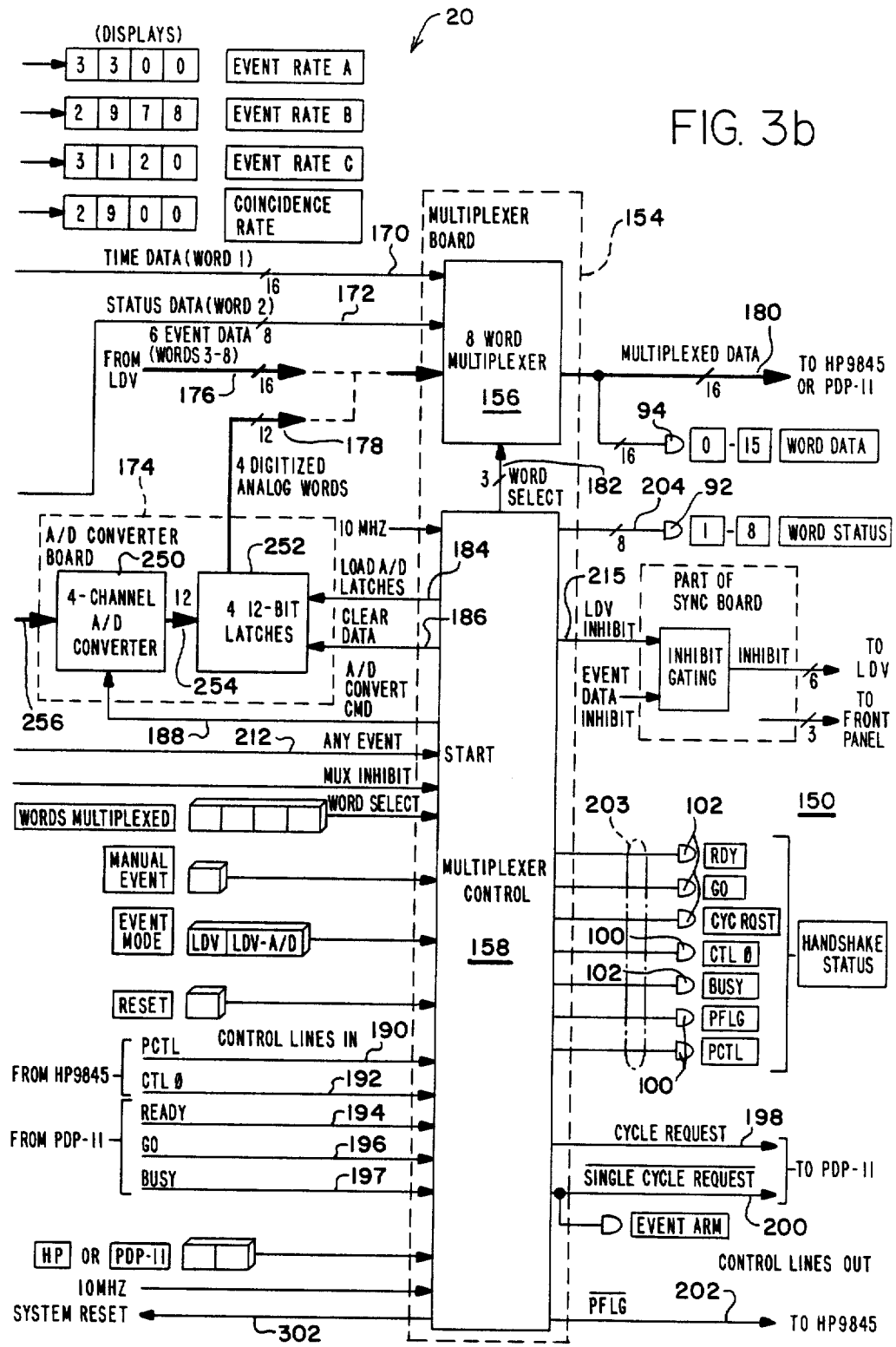

FIGS. 3a and 3b are a block diagram of the multiplexer interface 20. The multiplexer interface consists of a multiplexer section 150 (FIG. 3b) and a synchronizer section 152 (FIG. 3a). The 8-channel multiplexer section 150 consists of multiplexer board 154 and associated front panel switches and indicators (see also FIGS. 1 and 2). The multiplexer board 154 includes an 8-word multiplexer 156 and a multiplexer control circuit 158. The synchronizer section 152 consists of synchronizer board 160 and associated front panel switches and indicators (see also FIGS. 1 and 2). The synchronizer board 160 includes an event pulse synchronizer 162, a clock control 164, a real time interval counter/time word latch 166 and a status word latch 168.

The 8-word multiplexer 156 accepts up to eight digital word inputs. Words 1 and 2 are time and status data, respectively from the interval counter/time word latch 166 and the status word latch 168 of synchronizer board 160 on buses 170 and 172. Words 3-8 are digital inputs from the LDV and A/D converter board 174 on buses 176 and 178, respectively. With the event mode switch 80 (FIG. 1) set for LDV, the interface 20 transfers only digital data inputs, while combined digital and analog data are transferred with the event mode switch 82 (FIG. 1) set for LDV-A/D. The multiplexer 156 provides a 16 bit multiplexed data output on bus 180 to either a PDP-11 or HP 98032A system, depending on user selection with switches 98 and 96, respectively (FIG. 1). The binary status of the transferred data word is displayed by word data status indicators 94 (see also FIG. 1). The multiplexer 156 is sequenced through the 8-word inputs on buses 170, 172, 176 and 178 by a three-bit word select input from the multiplexer control circuit 158 on bus 182.

The multiplexer control circuit 158 controls operation of the 8-word multiplexer 15 by control signals on bus 182, the A/D converter 174 by control signals on lines 184, 186 and 188 and receives and provides handshake signals from and to the PDP-11 or HP processor on lines 190, 192, 194, 196, 197, 198, 200 and 202. The status of the handshake protocol is depicted by handshake status LEDs 100 and 102, connected to the multiplexer control 158 by lines 203 (see also FIG. 1).

For the PDP-11 minicomputer (at its initial ready state), the CPU of the minicomputer is on and ready, which is indicated by a lit RDY LED 102. In this state, the interface 20 is disabled, i.e., the occurrence of an LDV event will not be acknowledged. Computer software loads the various DRII-B registers of the minicomputer with the proper initial information. The CPU of the minicomputer then initiates a GO, which clears the RDY LED 102 and lights the GO LED 102. In this state, the interface 20 is enabled and waits for an LDV event pulse input, at which time the multiplexer cycle is initiated. With the multiplexer cycle initiated by an LDV event, the interface 20 sets the single cycle command (single cycle state) and generates the first cycle request (cycle request state), lighting the cycle request LED 102. Both signals are applied to the PDP-11 minicomputer. The single cycle command asserts a direct memory access (DMA) data transfer mode and inhibits the CPU of the minicomputer from servicing other peripherals until the single cycle command is reset. Upon receipt of the cycle request, the CPU sets CPU busy high and transfers the first data word on bus 0-15 word data LEDs 94 momentarily display the 180. The binary status of each bit of the transferred data word. At the end of one data word transfer, the CPU busy is reset low and increments the multiplexer 156 to the next word, then generates another cycle request to the CPU interface and the next transfer takes place. The word status LEDs 92, connected to the multiplexer control circuit 158 by lines 204, sequentially light and extinguish as each word is transferred (word count done state). This process repeats until the last word is transferred, at which time the event arm (single cycle command) is reset, and the number 1 LED of the word status LEDs 92 lights. At the end of the LDV event, the CPU program determines if the programmed number of events to be sampled is complete (event count done state). If not done, the interface 20 returns to the GO state and awaits the next LDV event, which initiates another cycle. If complete, the interface 20 is disabled and the CPU sets RDY high.

For the HP minicomputers, at its initial state, the minicomputer CPU is in a ready state and the interface 20 is disabled, which is indicated by a lit CTL0 LED 100. The CPU initiates a GO, which clears the CTL0 LED 100 and lights the PCTL LED 100. In this state, the interface 20 is enabled and waits for an event pulse input, at which time the transfer by multiplexer 156 is initiated. The interface 20 sets the transfer request (PFLG) command low (interface 20) ready for the next transfer. Upon receipt of PFLG low, the CPU transfers the first data word and then sets PCTL low. The 0–15 word data LEDs 94 momentarily display the binary status of each bit of the transferred data word. At the end of the data word transfer, the CPU sets PCTL high, which is detected by the interface 20 (PCTL set, CPU requesting new data). If the transferred word is not the last word, the interface 20 increments the multiplexer 156 to the next word. The word status LEDs 92 sequentially light and extinguish as each word is transferred. This process repeats until the last word is transferred. The remainder of the transfer process is the same as that for the PDP-11.

During transfers, the LDV INHIBIT is set high to prevent the LDV signal processor from processing a second event that is too close to the event being transferred. MUX INHIBIT is ORed in an inhibit gating circuit of the synchronizer board 160 with event pulse inputs A, B and C on lines 208, to produce the LDV INHIBIT signal on line 206. The ORed inhibit is only sent to the LDV processors that input an event. The LDV INHIBIT is typically used to slow down high speed processors so that a signal is only processed when the interface 20 is ready to transfer the signal. Use of LDV INHIBIT signals is optional.

Multiplexer timing is controlled by the 10 MHz clock signal on line 210 from the clock control 164 on synchronizer board 160. A SYSTEM RESET pulse is input by turning on power, by a CPU input, or by pressing the reset switch 106 (FIG. 1). The reset switch 106, when pressed, interrupts any data transfer in process.

The event pulse synchronizer 162 accepts three event inputs (A, B and C) on lines 208 and, based on the setting of event mode switches 80 and 82 (FIG. 1) outputs an any event signal on line 212 and line 214 to the multiplexer control circuit 158 and the clock control circuit 164, for either random event inputs or coincident event inputs. Events are coincident when they occur within the time set by the coincidence time control knob 42 (FIG. 1). If two or more events occur within the coincidence time, such as A and B, when in the A-B synchronous mode, they result in a single ANY EVENT pulse and are thereby synchronized. During the transfer cycle, further event processing by the LDV signal processors is inhibited by a LDV INHIBIT on line 215 from multiplexer control circuit 158. In the random event sync mode, the dead time control knob 44 extends the inhibit time up to 50 microseconds. With the reset mode set to internal with button 74 (FIG. 1), the ANY EVENT pulse applied to clock control 164 on line 214 results in loading the time and status word latches 166 and 168 on lines 216 and 218, and resetting the counter 166 for each event. The clock control circuit 164 produces the SELECTABLE CLK frequency on line 220, which drives the real time interval counter 166. The SELECTABLE CLK has six frequency outputs based on the setting of counter clock frequency switches 46–56 (FIG. 1). LDV events A, B and C may be time referenced to an external event by use of the external reset event input 76 (FIG. 1). With reset mode switch 72 set for external reset, inputting an external reset event on jack 76 results in an ANY EVENT signal on line 212 and a data transfer from the interface 20. The external reset event now performs the same control functions on the time interval counter 166 as previously described except that it alone controls the reset for the real time interval counter 166. Therefore for an event A, B or C, the counter loads out updated time data without interruption and continues counting until an external reset resets the counter 166. Event status inputs on lines 222 and external reset signals on line 224 are applied to the status word latch 168 to indicate which events initiated the data transfer. The time latch 166 provides a 16-bit-word output to the multiplexer 156 on lines 170, representing the count of the real time interval counter 166. If the counter 166 reaches a full count before an event occurs, it provides a CTR OVERFLOW EVENT signal on line 226 to event pulse synchronizer 162 and to the status word latch 168 on line 228. The CTR OVERFLOW EVENT results in an ANY EVENT signal on line 212 and 214, which transfers a full time count to multiplexer 156 from counter 166 on lines 170. The status word latch transfers an 8-bit data word on lines 172. Three bits of this word are event status of A, B and C, one bit is an external reset event status, a three bit code represents the selected counter clock frequency and one bit represents counter overflow. Sequential control logic drives the event rate displays 24, 26 and 28 and coincidence rate displays (FIG. 1). These displays provide event and coincident event rates in either events per second or 0.1 second, as determined by the gate time switch 78 (FIG. 1).

A/D converter 174 consists of four channel A/D converter circuits 250 connected to a set 252 of 12-bit latches by lines 254. The A/D converter circuits 250 accept analog inputs from rear panel connectors 124, 126, 28 and 130 (FIG. 2) on lines 256. The inputs may be bipolar of +10 to −10 volts and are sampled by the A/D converter circuits 250. The A/D convert CMD signal on line 188 halts the sampling process and starts the conversion process. The digitized analog signal is then latched into converter output latches 252 by the LOAD A/D LATCHES command on line 184. The data is read out of the latches 252 on bus 178 to multiplexer 156. The digitized analog signal is provided in a twos complement format, which is best suited for representing bipolar analog signals for CPU data processing. The conversion time is approximately 10 microseconds for the A/D conversion, with 12 bits of resolution, plus an additional four microseconds for the sample and hold amplifier settling time. Therefore the total A/D conversion cycle time is approximately 14 microseconds. The A/D converter latches 252 are cleared and set to zero by the CLEAR DATA command on line 186. This command is enabled (low) by either a manual reset with button 106 or a system reset.

Figure 4A:
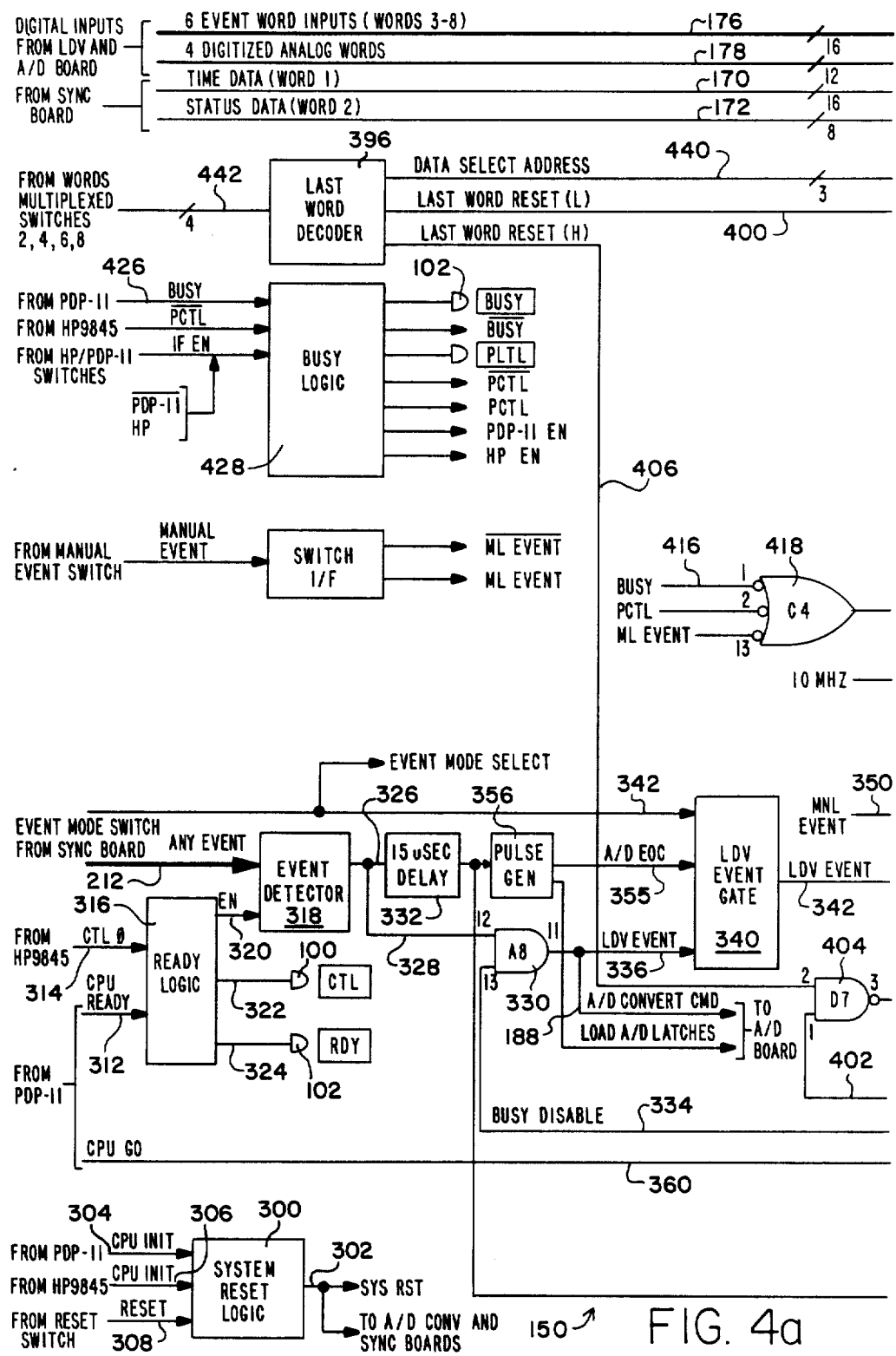
FIGS. 4a and 4b are a more detailed block diagram of a portion of the multiplexer interface shown in FIGS. 3a and 3b.
Figure 4B:
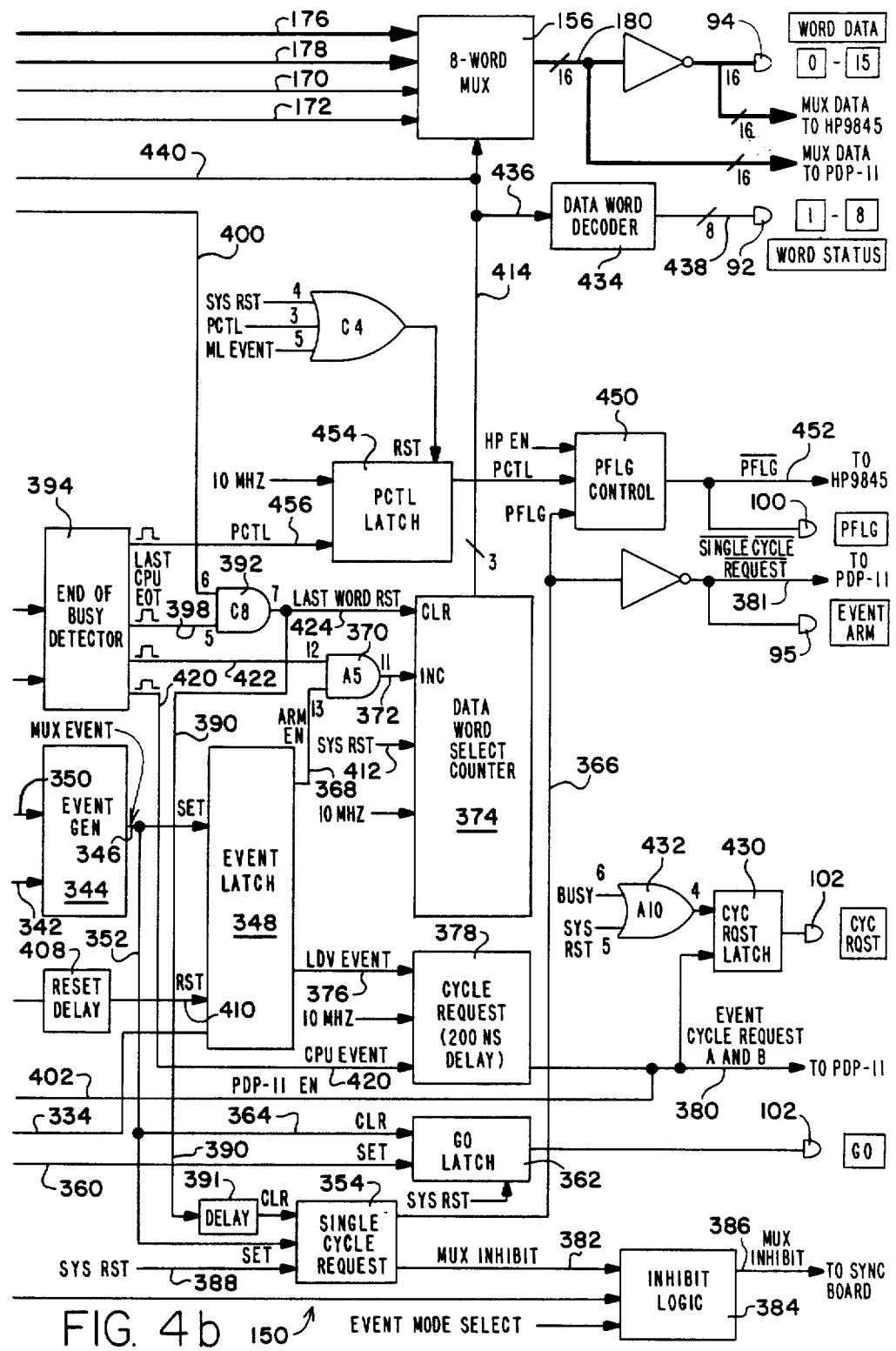

Further details of the multiplexer section 150 are shown in FIGS. 4a and 4b. All counters and latches in the interface 20 are cleared and reset by the SYSTEM RESET pulse, supplied by system reset logic 300 on line 302 (see also FIG. 3b). This pulse is generated by the system reset logic 300 in response to a CPU INIT command from either the PDP-11 on line 304, the HP-9845 on line 306, or from the reset switch 106 or when turning on power on line 308. The system reset logic 300 ORs the initialize inputs and eliminates contact bounce from the reset switch input. The system reset pulse is also applied to the A/D converter 174 and the synchronizer 160 (see FIGS. 5a and 6). The CPU READY and CTLO inputs are respectively supplied on lines 312 and 314 through ready logic circuit 316 to event detector 318 on line 320 and the CTLO or RDY LEDs 100 and 102 (see also FIG. 1) on lines 322 and 324. The purpose of either of these control bit inputs is to disable the interface 20, thus allowing software control of it by either computer. In the non-transfer state of interface 20, the event detector 318 waits for an ANY EVENT input on line 212 from synchronizer 162. The event detector 318 accepts the ANY EVENT pulse and, if enabled by the ready logic 316, provides a 200 nanosecond pulse on line 326. A CPU RDY or CTLO high input inhibits the event detector 318, preventing multiplexer transfers, and lights the RDY or CTLO LEDs 102 or 100.

In the digital only LDV mode, selected with button 80 (FIG. 1), the event detector 318, with CPU RDY and CTLO low, detects the ANY EVENT pulse on line 212 and applies it on line 328 to one input of event gate 330 and to the 15 microsecond delay circuit 332 (disabled in the digital only mode). The other input to event gate 330 is the BUSY DISABLE signal on line 334. During the time that the multiplexer 156 is transferring data, the BUSY DISABLE input is high. The high input inhibits the ANY EVENT pulse on line 336 and line 188 from being applied to LDV event gate 340 and the A/D converters 250. When the multiplexer 156 is not busy, the BUSY DISABLE input is low. The low input enables the event gate 330, which then allows an ANY EVENT signal on line 212 to produce an LDV EVENT signal on line 336 and an A/D CONVERT CMD signal on line 188. With the EVENT MODE switch 80 thrown to the LDV position a selection signal on line 342 enables the LDV event gate 340 to supply the LDV EVENT signal on line 342 to event generator circuit 344. The event generator circuit 344 produces a MUX EVENT signal on line 346 to set event latch 348. Pressing the manual event button 104 (FIG. 1) also provides an input signal on line 350 to the event generator 344. The MUX EVENT signal is delayed 100 nanoseconds from the inputs on lines 342 or 350. The MUX EVENT signal is also supplied on line 352 to set single cycle latch 354.

In the LDV-A/D combined mode of interface 20, the MUX EVENT signals on lines 346 and 352 result from a 15 μsec delay pulse on line 355 which emanates from pulse generator 356 and feeds LDV event gate 340. The EVENT signal is delayed 15 microseconds by delay circuit 332, enabled by the LDV-A/D event mode button 82 (FIG. 1) to allow time for the A/D converters to complete conversion. The output of event detector 318 also results in the A/D convert command on line 188 in this mode. The convert time is approximately 14 microseconds. The purpose of the 15 microsecond delay circuit 332 is to delay generation of the MUX EVENT signal on line 346 and 352 to allow time for the A/D converter 250 (FIG. 3b) to complete the conversion cycle before transferring data.

When handshaking with the PDP-11 minicomputer, a multiplexer data transfer cycle is initiated by executing a CPU GO in software, which clears the CPU READY input on line 312. When the CPU READY input on line 312 goes low, it enables the event detector 318 and turns off the RDY indicator 102. A high CPU GO input on line 360 sets GO latch 362, which turns on the GO LED 102 (see also FIG. 1). Typically the GO LED 102 is only lit for a very short time and is cleared by the MUX EVENT signal resulting from the first LDV EVENT on line 364. The MUX EVENT pulse also sets the event and single cycle latches 348 and 354. The single cycle latch 354 provides a single cycle request on line 366 to the PDP-11 minicomputer and to the EVENT ARM indicator 95 (see also FIG. 1). The event latch 348 provides an ARM EN signal on line 368 to enable gate 370, which supplies an increment signal on line 372 to the data word select counter 374. The event latch 348 also supplies an LDV event signal on line 376 to cycle request gate 378. The LDV event input to cycle request gate 378 generates the first cycle request to the PDP-11 minicomputer on line 380 to initiate the data transfer cycle. The cycle request gate delays the cycle request command 200 nanoseconds, which allows time for the single cycle request on line 366 to be recognized by the PDP-11 DR 11-B interface, and time for the next data word being transferred to settle on the lines when it is selected. The other output of the single cycle latch 354 is a MUX INHIBIT signal, supplied on line 382 through inhibit logic circuit 384 to synchronizer 160 on line 386. The single cycle latch 354 is reset by either a SYS RST signal on line 388 or an END OF TRANSFER (EOT) signal on line 390, through gate 392 by end of busy detector 394 and last word decoder 396, respectively connected to the gate 392 by lines 398 and 400. The EOT signal on line 390 is delayed for 200 nanoseconds by delay circuit 391, which consists of two D-type flip flops clocked at 10 MHz, the output of which is supplied as the CLEAR input to single cycle flip-flop 354. Delaying the EOT signal in this manner allows an improved data rate transfer during a direct memory access (DMA) through the interface 20, explained more fully below. The cycle request pulse on line 380 is also supplied on line 402 to one input of two input NAND gate 404. The other input to NAND gate 404 is the EOT (end of transfer) enable from the last word decoder 396 on line 406. The output of NAND gate 404 is delayed 200 nanoseconds in delay circuit 408 and is then used to reset event latch 348 on line 410.

When data word select counter 374 is initialized by a SYS RST signal on line 412, its output address on lines 414 is 000, which selects the first data word on the multiplexer inputs 170, 172, 176 and 178. The multiplexer output on bus 180 is transparent to the word selected by the 000 address, and therefore outputs the first word. The first cycle request is then generated on line 366 by single cycle latch 354 as a result of the LDV EVENT signal on line 342. The yycle request high on line 366 received by the PDP 11 DR 11-B interface resuolts in the computer setting BUSY high while reading the first data word. When the transfer of the first word is complete, the CPU busy lines 416, 426 are set low. The end of busy detector 394 receives the CPU BUSY low input on line 416 through OR gate 418 and generates the next cycle request (CPU event) pulse on line 420. The end of busy detector 394 also generates a 100 nanosecond pulse on line 422 just prior to the cycle request pulse on line 420. The 100 nanosecond pulse increments the data word select counter 374 to the next data word in sufficient time for the data lines to settle before the computer responds to the cycle request on line 380. At the same time the last word reset low input on line 400 to the clear line of AND gate 392 prevents a LAST WORD RST command on line 424 from clearing counter 374. The CPU BUSY signal is also supplied on line 426 to BUSY logic 428 to light the BUSY LED 102 and to clear the cycle request latch 430 through OR gate 432. The data output from multiplexer 156 on bus 180 is also applied through drivers to display the transfer data momentarily on the word data LEDs 94. The data word select counter 374 address output on lines 414 is also supplied to data word decoder 434 on lines 436. The data word decoder 434 provides eight separate drive signals on lines 438 to word status LEDs 92 by decoding the address. The last word decoder 396 also receives the data select address on lines 440 and compares the address with the word select input from the words multiplexed switches 84, 86, 88 and 90 on lines 442. If the address matches the word select input, the last word decoder 396 produces a last word reset high and low.

On transfer of the last data word, the last word reset low output of the last word decoder 396 on line 400 is ANDed by AND circuit 392 with the end of busy detector 394 100 nanosecond pulse output on line 398. The output of AND gate 392 on line 424 clears the data word select counter 374 and, on line 390, the single cycle latch 354. The last word decoder 396 last word reset high output on line 406 is ANDed with the last cycle request on line 402 and supplied to reset delay circuit 408 to reset event latch 348. As a result, the data word select counter 374 is disabled. The last busy input to the cycle request indicator latch 430 clears the latch, the data word select counter 374, and turns off the cycle request LED 102.

When the multiplexer interface 20 is operating with an HP minicomputer, the select switch 96 is activated to enable the PFLG control gate 450. The data transfer cycle of the multiplexer 156 is initiated by executing a CPU GO in software, which clears the CTLO on line 314. When CTLO goes low, it enables the event detector 318 and turns off the CTLO LED 100. The event pulse from event generator 344 sets the event latch 348 and the single cycle latch 354. The single cycle latch 354 provides a PFLG input to PFLG control 450 and lights the event arm indicator 95. The output of PFLG control gate 450 lights the PFLG LED 100 and provides a PFLG low signal to the HP minicomputer on line 452, which accepts the first data word After ten microseconds, the CPU of the HP minicomputer sets PCTL low. The PCTL low signal is applied through the busy logic circuits 428 to the end of busy detector 394 and PCTL latch 454. The detector 394 provides an increment pulse to the data word select counter 374 through AND gate 370. Counter 374 is advanced to word 2, which is the next data word to be transferred. The PCTL signal resets the PCTL latch, which sets PFLG high (busy). The output of end of busy detector 394 on line 456 is delayed 300 nanoseconds, then sets the PCTL latch 454, which in turn sets PFLG low and results in transferring the next data word. This process repeats until the last word decoder 396 supplies a last word reset on line 400. The cycle repeats when an event signal sets single cycle request latch 354, which sets PFLG. The multiplexer interface 20 is connected to HP minicomputers through an HP 98032A 16-bit interface, or on newer HP systems, an equivalent which emulates that interface.

The manner in which the presence of the 200 nanosecond delay circuit 391 in the multiplexer section 150 improves the data transfer rate during a DMA is as fllows. The DMA mode of operation of the DEC PDP-11 provides the highest transfer rates of data into the computer input buffer To provide this mode of operation requires the use of the DEC DRll-B DMA Interface. The DRll-B interface has a SINGLE CYCLE control function that, when asserted by the LDV multiplexer interface 20, takes control of the the system UNIBYS away from the PDP-11 CPU and allows data to be transferred directly into an input buffer memory (DMA), without being serviced by the CPU.

Tests revealed that the SINGLE CYCLE function 381 must be asserted by the LDV multiplexer for more than the expected duration of time required for the data transfers. When this function is released, it returns control of the UNIBUS back to the PDP-CPU. Premature release of the SINGLE CYCLE function will cause the last data word to be serviced by the CPU as a standard interrupt and not as a DMA. An interrupt requires several machine cycles by the CPU, and consequently, much more time to perform a data transfer.

This extended duration needed by the SINGLE CYCLE function was not fully appreciated until efforts were made to increase the data transfer rate. The duration of the SINGLE CYCLE function could be extended by delaying the CLEAR function 390 of the SINGLE CYCLE control flip-flop 354. It was found by experimentation that a delay of 200 nanoseconds after the last data CYCLE REQUEST resulted in the best data transfer rate. This delay is achieved by inserting two D-type flip-flops 391 clocked at 10 MHz on the CLEAR input of the SINGLE CYCLE flip-flop 354.

The resulting data transfer rate achieved was 1.14 megabytes per second. This data transfer rate is approximately 50 percent higher than that of a commercially available TSI, Inc. interface referenced above, intended for the same application.

Figure 5B:
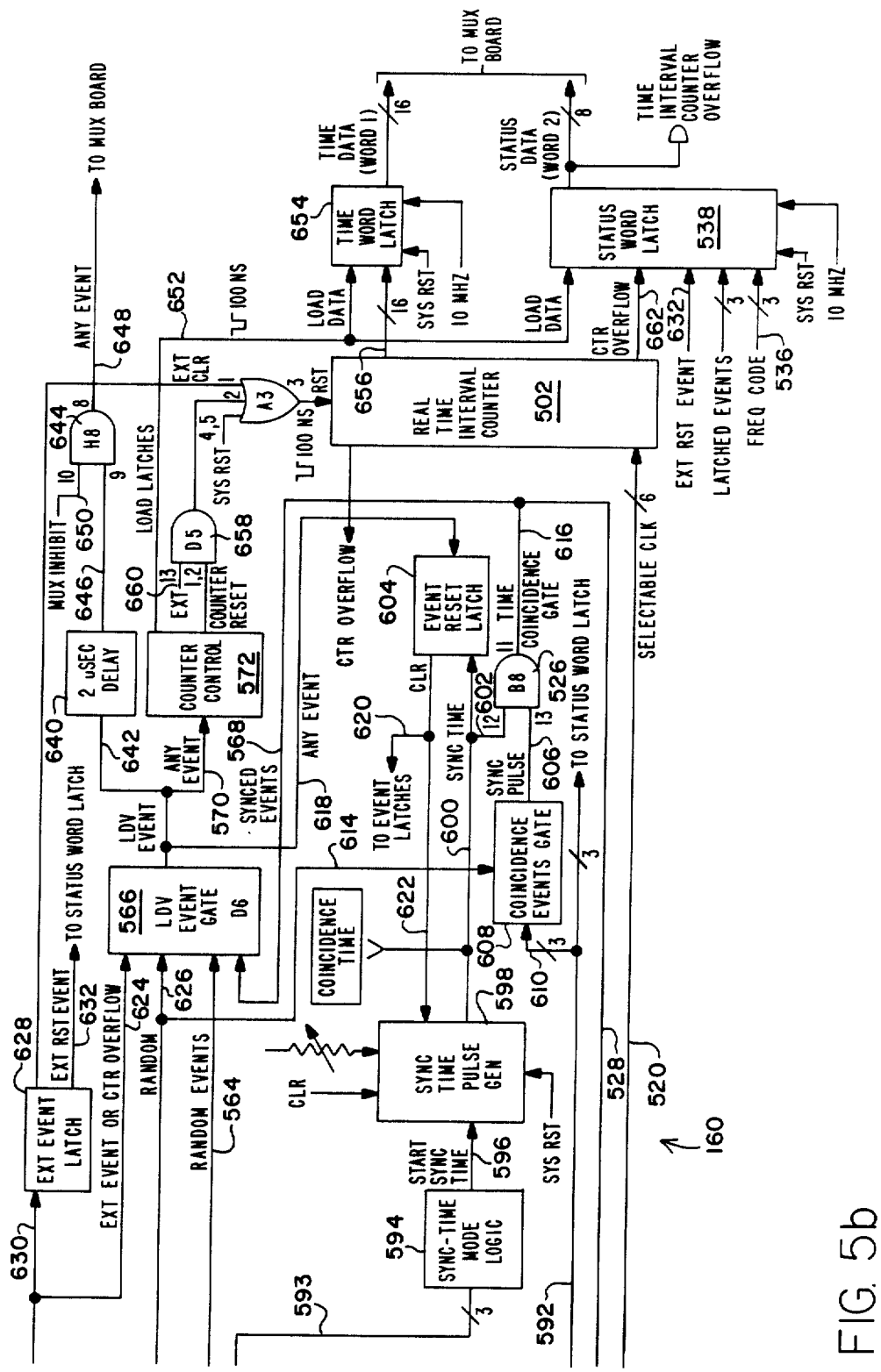

Details of the synchronizer 160 are shown in FIGS. 5a and 5b. The synchronizer 160 generates LDV event pulse timing, event pulse synchronization, transferring time and status data words to the multiplexer section 150. Event time interval data is generated by clock frequency selector 500, i.e., a variable clock and real time interval counter 502, i.e., an upcounter circuit. The 10 MHz clock frequency selector 500 is prescaled to provide eight additional output frequencies of 1 MHz, 500 kHz, 100 kHz, 10 kHz, 1 kHz, 100 Hz, 10 Hz and 10 Hz. The 1 Hz, 10 Hz, and 500 kHz outputs provide timing for the event and coincidence rate displays 24, 26, 28 and 30 (FIG. 1). The 1 Hz and 100 kHz and outputs are provided on lines 504 and 506 through rate select display circuit 508 and line 510 to event and coincidence rate display logic 512. The 500 kHz output is supplied on line 514 to the event and coincidence rate display logic 512. The 10 MHz output is supplied on lines 516 and 518 as a clock frequency for the synchronizer section 160 and the multiplexer section 150. The SELECTABLE CLK frequency is supplied on lines 520 as the clock frequency for real time interval counter 502. The display time rate select circuit 508 is connected to gate time select switch 78 (FIG. 1). A 1 Hz gate frequency displays event/second while a 10 Hz gate frequency displays events/0.1 second (X10). The 500 kHz output on line 514 is used to drive the display logic 512. Event and coincidence event pulses received from the event pulse detectors 522 on lines 524 and the coincidence events AND gate 526 on line 528 sequence the displays 24, 26, 28 and 30. The counter clock frequency switches 46, 48, 50, 52, 54 and 56 (FIG. 1) provide six outputs, which are supplied on lines 530 to switch encoder 532, then supplied on line 534 to the clock frequency selecter 500 and on lines 536 to status word latch 538. The decoded switch output is transferred as part of word 2 of an event data transfer.

The synchronizer 160 accepts up to three separate event pulses from an LDV on event pulse input lines 540, connected to the event pulse detectors 522. The separate event pulses have a minimum pulse duration of 200 nanoseconds, and are applied to three separate event pulse detectors within block 522. Each event pulse detector produces a uniform 100 nanosecond event pulse output regardless of the quality of the event pulse input. These event pulses are applied to random OR gate 542 on lines 544, event latches 546 on lines 548, sync-time mode logic 594 on lines 593 and the event and coincidence rate display logic 512 on lines 524. The inhibit circuit OR gate 542 passes all inputs as random events pulses, which are applied on line 550 as one inptt to NAND gate 552. With line 554 (MUX INHIBIT) high, NAND gate 552 allows the first random event pulse on line 550 to trigger the dead time pulse generator circuit 556 through a 2 microsecond delay circuit 558 on lines 560 and 562. The delayed random events pulses are also supplied on line 564 as one input to LDV event gate 566. The delayed random events pulses are ORed with synched LDV events pulses supplied on line 568 by the event gate 566. The resulting ANY EVENT outputs on line 570 are supplied to counter control circuit 572. The dead time pulse generator circuit 556 outputs a 5 to 50 microsecond pulse as set by the front panel dead time control 44 (FIG. 1). Dead time may be monitored at the front panel connector 574. Dead time is applied on line 576 through AND gate 578 to inhibit gate circuit 580 on line 582. The inhibit OR gate 580 also receives latched event signals on lines 584 and MUX INHIBIT signals on line 586 and provides from one to three LDV INHIBIT commands to the LDV on lines 588 and to the front panel LDV INHIBIT output connectors 66, 68 and 70 (FIG. 1) on lines 590. The LDV INHIBIT outputs prevent the LDV signal processors from processing further events while the multiplexer interface 20 is transferring event data. When an LDV event A, B or C occurs and is latched by the event latches 546, it is applied to the appropriate INHIBIT OR gate in inhibit OR gate circuits 580 for the applicable event channel A, B or C. The latched event is gated out as LDV INHIBIT on the applicable channel on lines 588 to inhibit that channel's signal processor. Two microseconds later, dead time is applied to all of the inhibit OR gates 580 and is followed by MUX INHIBIT. The duration of the inhibit depends on which is greater, the duration of dead time (up to 50 microseconds), or the duration of MUX INHIBIT (up to 30 microseconds).

The LDV random event outputs are applied on lines 593 along with the synchronous mode positions selected by event synchronous mode switches 32-40 (FIG. 1) to synchronous mode gates 594. Only one synchronous mode select input, A-B, A-C, B-C or A-B-C is input at one time. The select mode input enables an AND gate in sync -time mode logic 594, which accepts the designated LDV random event inputs. The leading edge of the first event input required for coincidence is passed through the mode logic 594 as a START SYNC on line 596 to trigger the synch time pulse generator 598. As set by the front panel dead time 28 control 44 (FIG. 1), pulse generator 598 produces a 5-50 microsecond coincidence time pulse on line 600. The coincidence time pulse is applied to time-coincidence gate 526 on line 602 and to event reset latch 604. The time-coincidence gate 526 also receives the latched coincident events on line 606 from coincidence events gate 608. The coincidence events gate 608 accepts latched events signals on line 610 and synch mode select inputs from the event synch mode switches 32-40 (FIG. 1) on lines 614. When latched events are present for the selected synch mode within the 5-50 microsecond synch time, the synch gate 526 produces a SYNCED EVENT output pulse on line 616. The SYNCED EVENT output increments the coincidence rate display 30 (FIG. 1) and results in an LDV EVENT output on line 570 through event gate 566. The LDV EVENT output is also supplied on line 618 to the event reset latch 604, which clears the event latches 546 on line 620 and resets the synch time pulse generator 598 on line 622, either after an ANY EVENT input or on the trailing edge of the synch time input on line 600, if a synch event has not occurred.

LDV event gate 566 produces an ANY EVENT output on line 570 from a SYNCED EVENT on line 568, an external event or counter overflow on line 624, or a random event input on line 564. A random enable input must also be present on line 626 to produce an ANY EVENT output from the random events input on line 564 from random event synch mode switch 40 (FIG. 1). External time counter reset switch 72 (FIG. 1) must be set to enable the external event circuits to produce the external event input on line 624. An external reset input or CTR overflow input also sets external event latch 628 on line 630. The output of external event latch 628 is applied to status word latch 538 on line 632. The latch output also disables a NAND gate controlling event gate 566. If the NAND gate is not disabled, it passes LDV events through event gate 566 to counter sequential control logic 572. The control logic 572 is also triggered by the CTR overflow output of real time interval counter 502.

The ANY EVENT output of event gate 566 is also applied to a two microsecond delay circuit 640 on line 642 and to the counter control circuit 572. The any event signal is delayed two microseconds and applied to multiplexer section 150 through AND gate 644 on lines 646 and 648. The output of AND gate 644 is inhibited during interface 20 transfer cycles by the MUX INHIBIT command on line 650. The ANY EVENT signal to the counter control circuit 572 results in a 100 nanosecond LOAD LATCHES command on line 652, and in 200 nanoseconds is followed by a 100 nanosecond reset signal, which is followed by a 400 nanosecond ANY EVENT signal. Therefore, simultaneously with an ANY EVENT signal, the 16-bit time data word of the real time counter 502 is loaded into time word latch 654 on lines 656, and the counter is reset to zero and resumes counting The LOAD LATCHES command also latches the status of CTR OVERFLOW, EXT REST EVENT, LATCHED EVENT and a three-bit frequency code into the status word latch 538. Time and status data (words 1 and 2 respectively) are transferred to the minicomputer CPU, along with the LDV signal processor velocity data (words 3-8) for each event occurrence, by the multiplexer 156 (FIG. 4B). With time counter reset external switch 72 activated, an LDV event loads the latches with the current count in the real time interval counter 502. However, the ANY EVENT reset is inhibited by AND gate 658 as a result of the input on line 660. Therefore, real time interval counter 502 continues counting from the last count loaded out. The real time 21 interval counter 502 provides time with 16-bit resolution in binary code. If an external event does not occur before the counter reaches a full count and resets the count to zero, then the real time interval counter 502 outputs a CTR OVERFLOW on line 662, which results in an ANY EVENT signal. The CTR OVERFLOW and counter 502 full time count are transferred to the minicomputer CPU. The time interval counter overflow LED 58 (FIG. 1) is lit by the transferred data word. At the next ANY EVENT, time and status is transferred to the CPU. The operator may then add the two times to determine the actual interval between events.

Figure 6B:
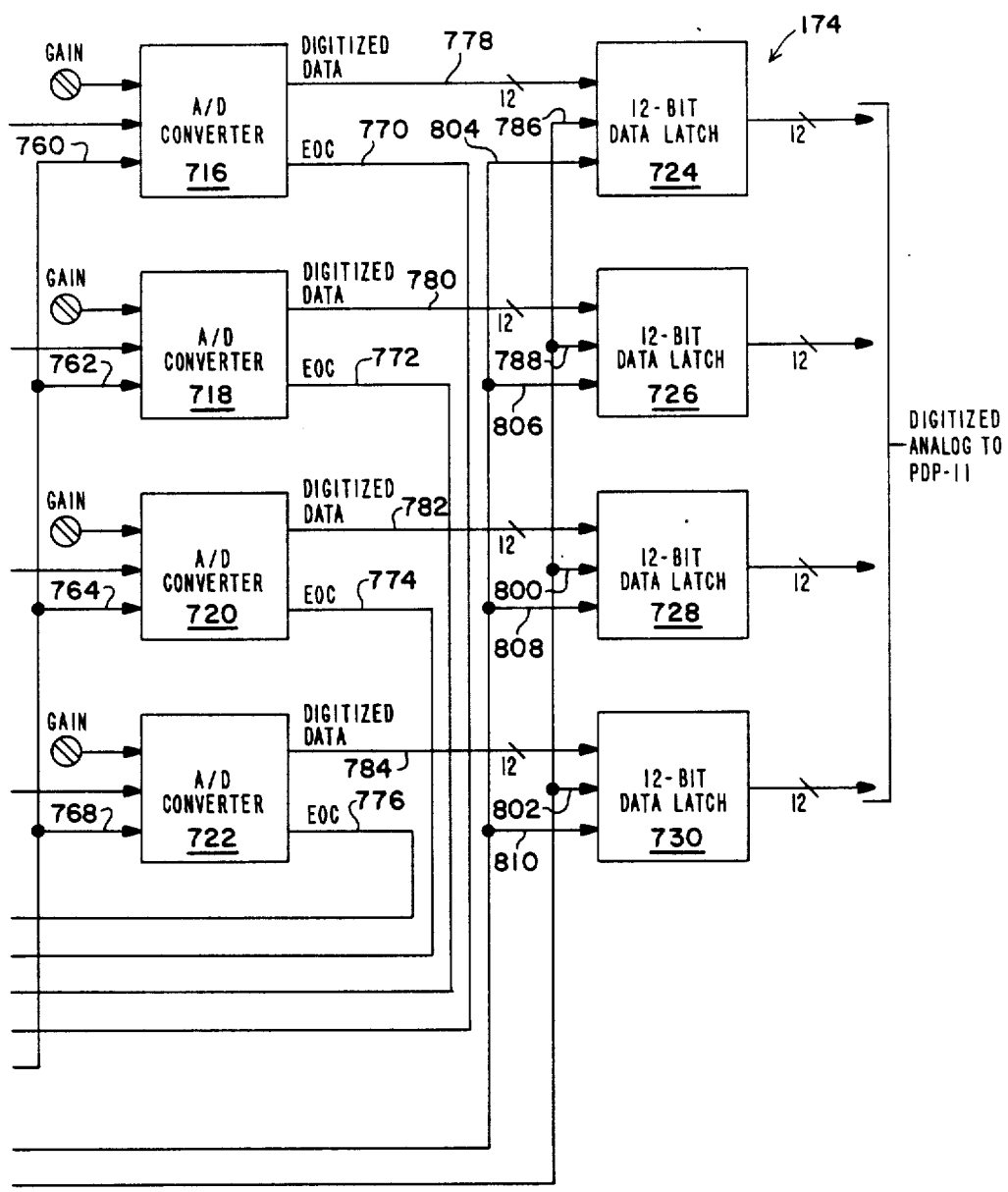

Details of the A/D converter 174 (FIG. 3B) are shown in FIGS. 6a and 6b. The primary functions of the A/D converter 174 are to sample and hold analog inputs on lines 700, 702, 704 and 706 in sample and hold amplifiers 708, 710, 712 and 714, to digitize these inputs in A/D converter circuits 716, 718, 720 and 722 and to store the digitized data in 12-bit data latches 724, 726, 728 and 730 The sample and hold amplifiers 708-714 accept a bipolar voltage input over the range of +10 to −10 volts. The amplifiers 708-714 sample the voltage inputs on line 700-706 until control logic 732 receives an A/D CONVERT command on line 734. The control logic 732 then generates an INITIAL HOLD pulse of one microsecond, supplied to the sample and hold amplifiers on lines 736, 738, 740 and 742 through OR gates 744, 746, 748 and 750 and lines 752, 754, 756 and 758. Simultaneously, the control logic 732 provides a CONVERT command pulse of 0.5 microseconds to the A/D converters 716-722 on lines 760, 762, 764 and 768. The CONVERT command starts the analog to digital conversion. During conversion the EOC output of each A/D converter 716-722 is set high. The EOC outputs are applied to the sample and hold inputs 752-758 of the sample and hold amplifiers 708-714 through OR gates 744-750 on lines 770, 772, 774 and 776, respectively, maintaining the amplifiers 708-714 in a hold state. At the completion of the analog to digital conversion, the EOC outputs are set low to allow the sample and hold amplifiers 708-714 to return to a sample state, where they remain for at least four microseconds. The digitized data from A/D converter 716-722 on lines 778, 780, 782 and 784 is loaded into the 12-bit data latches 724-730 by the LOAD A/D LATCHES input from multiplexer section 150 on lines 786, 788, 800 and 802. The latched outputs are applied to rear panel A/D digital output connectors 136-142 (FIG. 2). The latches are cleared and set to zero by a data latch clear (SYS RST) low input from the multiplexer section 150 on lines 804, 806, 808 and 810.

The use of the multiplexer interface 20 to allow data input to a multiplicity of different type minicomputers is enhanced through use of the program routines in the listing attached as appendices to this specification. These program routines provide further understanding of the operation of the interface 20.

It should now be readily apparent to those skilled in the art that a novel multiplexer interface 20 capable of achieving the stated objects of the invention has been provided. The interface of this invention provides an increased amount of information about data on measured events or other varying signals passing through the interface, so that the user can set the interface for optimum operation. The interface allows either all digital inputs or a combination of digital inputs and analog inputs converted to digital form to be supplied to different minicomputers. Various selected combinations of synchronized data from the inputs can be provided. Handshaking protocols with the different minicomputers are implemented in an improved manner to minimize transfer time.

It should further be apparent to those skilled in the art that various changes in form and details of the invention as shown and described may be made. It is intended that such changes be included within the spirit and scope of the claims appended hereto.

AFPENDIX A APPLICATION TO THE DEC PDP11 SERIES COMPUTERS

The following is a program listing using the DEC PDP11-34 computer with the DR11-B interface and the RSX11-M operating system to acquire data from the LDV Multiplexer Interface. A similar application has also been made using the DEC PDP11-44 computer.

```
                    SUBROUTINE YBCALL(IDATA,NWORDS)

C
C       OBTAIN 16-BIT DATA USING DR11-B BY MEANS OF PDP RSX11-M
C       OPERATING SYSTEM DIRECTIVE CALLS.
C
C       IDATA      — ARRAY INTO WHICH DATA IS WRITTEN,
C                    DIMENSION IN CALLING PROGRAM
C       NWORDS     — # OF WORDS WRITTEN
C
C
C
C
C
C
        DIMENSION IPARAM(6),ISB(2),IDATA(1)
        DATA IPARAM/6*0/
        DATA LUNYB,IFLAG/2,20/
C
C
C       STARTING VIRTUAL ADDRESS(IADR) OF BUFFER ARRAY(IDATA) IS
C       REQD FOR DR11-B QIO DIRECTIVE
C
        CALL GETADR(IADR,IDATA)
C
C
        IPARAM(1)=IADR
        IPARAM(2)=2*NWORDS              !#BYTES TO BE OBTAINED
        IPARAM(3)=1
```

-continued

| SUBROUTINE YBCALL(IDATA,NWORDS) |
| --- |
| CALL WTQIO("1000,LUNYB,IFLAG,,ISB,IPARAM,IDS) |
| IF(IDS.LE.0) STOP 'QIO YB:' |
| IF (ISB(1).NE.1) |
|   * WRITE (6,400)ISB(1),ISB(2),IDS |
| C |
| C     RETURN |
| C |
| C     ******* FORMATS ******* |
| 400   FORMAT(2X,'YB: ISB=',O6,2X,O6, 'IDS=',O6) |
|     END |

APPENDIX B

Computers

Application to the HP-9845 Series

INTRODUCTION The following software and documentation is presented here as a sample of that which has been used with the HP-9845 desk-top computer and the LDV Multiplexer interface, to obtain data for routine LDV measurements in wind tunnels. The program listing provided here may have to be modified for other HP computer series inasmuch as variations in programming languages occur from one computer series to another.

PROGRAM DESCRIPTION

The test program will acquire LDV and/or analog data (through an A/D converter) from the LDV Multiplexer Interface. The program is capable of receiving up to 32,000 words from the interface before the buffer memory is full. A maximum of 8 words can be acquired as a mixture of LDV and analog data words for each sample. The maximum data transfer rate in this configuration is aapproximately 49,600 words/second. This results in a sample rate of 12,400 samples/second for the case of 4 words per sample or 6,200 samples/second for the case of 8 words per sample. Each word for each sample will be printed or displayed after all of the data is acquired.

OPERATING PROCEDURE

The operating procedure for the running of the program is described by the following example. The following example is for a sample of 4 words, one of which contains A/D data.

1. Configure the HP98032A interface as follows.
   a. Make sure that the HP9845 and the CI are turned OFF.
   b. Make sure that the select code switch on the interface is set to the desired select code.
   c. Make sure that only jumpers 9, B, and D are installed within the HP98032A interface.
   d. Insert the HP98032A into the back of the HP9845.
   e. Connect the other end of the HP98032A interface to the CI (J10).
2. Connect the following signal inputs to the CI.

| SOURCE | DESTINATION |
| --- | --- |
| a. Sine Wave Generator (± 10 Volts max) | Analog Input (J11) |
| b. Trigger Source | LDV Event Inputs (Channel A) |
| c. A/D Digital Output (Channel 1, J15) | Digital Multiplexer Inputs |

-continued

| SOURCE | DESTINATION |
| --- | --- |
| | (Word3, J3) |

3. Set the switches on the CI as follows:

| SWITCH | POSITION |
| --- | --- |
| a. Event Sync Mode | Random |
| b. Coinidence Time | 5 us |
| c. Dead Time | 5 us |
| d. Counter Clock Freq. | 10 MHz |
| e. Time Counter Reset | INT |
| f. Gate Time | 1 Sec |
| g. Event Mode | LDV-A/D |
| h. Words Multiplexed | 4 |
| i. HP/PDP11 | HP |

4. Turn on the CI
5. Set the switches on the HP9845 as follows.

| SWITCH | POSITION |
| --- | --- |
| a. AUTO ST | DOWN |

6. Insert the tape containing the test program into the right tape drive (T15).
7. Turn on the HP9845. The test program "TestCI" will automatically load from the tape and start executing.
8. Type the following information into HP9845.
   a. The number of samples that are to be acquired from the CI.
   b. The number of words in each sample. Should be the same as on the Words Multiplexed switch on the CI.
   c. The select code. Should be the same as on the select code switch on the HP98032A interface.
   d. Type in a "Y" for printer or "N" for CRT print outs.
   e. For each work in the sample, type in the base you want that data word to be printed in.
      10: Decimal
      8: Octal
      2: Binary
      0: For A/D data. Data will be converted to volts.

MAXIMUM DATA RATES

| MAXIMUM DATA RATES STATEMENT | DATA TRANSFER RATE |
| --- | --- |
| ENTER Sc WFHS Samples*Words NOFORMAT;Data(*) | 49,600 words/second |
| ENTER Sc WHS NOFORMAT;Data(*) | 2,800 words/second |
| ENTER Sc WHS USING | 450 words/second |

-continued

| MAXIMUM DATA RATES STATEMENT | DATA TRANSFER RATE |
|---|---|
| "#,W";Data(*) | |

```
100   Testci:   OPTION BASE 1
110             INTEGER Words,Samples,Sc,Dumy(7),Data(4000,8),Base(8)
120             GOSUB Init
130             GOSUB Reset
140   Start:    GOSUB Enter
150             GOSUB Heading
160             GOSUB Print
170             GOTO Start
180             STOP 190   Init:     INPUT "How many samples do you want to take? (4000 max)",Samples
200             INPUT "How many words are to be multiplexed? (8 max)",Words
210             INPUT "What is the select code for the HP98032A?",Sc
220             INPUT "Do you want the data to be printed on paper? (Y or N)",A$
230             For W=1 TO Words
240                DISP "What base should word #"&VAL$(W)&" to be printed in";
250                INPUT Base(W)
260             NEXT W
270             PRINTER IS 16*(A$[1,1]="N")
280             REDIM Dumy(Words-1),Data(Samples,Words),Base(Words)
290             RETURN
300   Reset:    DISP "Reseting CI"
310             RESET Sc
320             CONTROL MASK Sc;1
330             CARD ENABLE Sc
340             ENTER Sc WDMA Words-1 NOFORMAT;Dumy(*)
350             RETURN
360   Enter:    DISP "Press continue to take data"
370             PAUSE
380             DISP "Taking "|Samples|"samples"
390             ENTER Sc WFHS Samples*Words NOFORMAT;Data(*)
400             RETURN
410   Heading:  DISP "Printing heading"
420             FOR W=1 TO Words
430                IF (Base(W)<>0) AND (Base(W)<>2) AND (Base(W)<>8) THEN Base (W)=10
440                PRINT USING "#,5A,DD"|"Words#",W
450                PRINT RPT$(" ",2+10*(Base(W)=2));
460             NEXT W
470             PRINT
480             FOR W=1 TO Words
490                IF Base(W)>0 THEN PRINT USING "0,5A,DD";"Base=",Base(W)
500                IF Base(W)=0 THEN PRINT "Volts ";
510                PRINT RPT$(" ",2+10*(Base(W)=2));
520             NEXT W
530             PRINT
540             RETURN 550   Print:    DISP "Printing data"
560             FOR S=1 TO Samples*(Samples<=100)+100*(Samples>100)
570                FOR W=1 TO Words
580                   IF Base(W)<>2 THEN 630
590                   FOR B=15 TO 0 STEP -1
600                      PRINT USING "#,D";BIT(Data(S,W),B)
610                   NEXT B
620                   PRINT USING "#,3X"
630                   IF Base(W)=0 THEN PRINT USING "#,MDZ.DD,3X";10*Data(S,W)/2 11
640                   IF Base(W)=8 THEN PRINT USING "#,6Z,3X";OCTAL(Data(S,W))
650                   IF Base(W)=10 THEN PRINT USING "#,M5Z,3X";Data(S,W)
660                NEXT W
670                PRINT
680             NEXT S
690             RETURN
```

What is claimed is:

1. A multiplexer for interfacing between a plurality of event measuring channels, each channel generating event data when a measured event occurs on that channel, two or more of said channels being capable of simultaneously generating event data, and a data processing system which comprises a plurality of inputs for receiving the event data, one input for each event measuring channel, means for performing a coincidence test on the event data received at said inputs, clock control means connected to said event data coincidence means for producing time data representative of the time interval between successive events a first display means for each of said plurality of measured events connector receive clock siganls from said clock control means for indicating an event data rate, as econd display means connected to receive clock signals from said clock control means to indicate a coincidence rate between event data for any selected combination of the measured events, a multiplexer connected to receive the event data from said inputs and said time data from said clock control means and having an output for connection to supply the event data and time data to a single input of the data processing system a control means for said multiplexer connected to supply control signals to said multiplexer for selecting the event data and the time data for output from said multiplexer control means being connected to receive start signals from said event data coincidence means, means for providing user inputs connected to provide the user inputs to said multiplexer control means, said multiplexer control means being configured to be responsive to the inputs from said user inputs means to select desired outputs from said multiplexer, and a time intervanl counter connected to receive control signals from said clock control means and a third dispaly means connected to indicate overflow of said time interval counter, said time interval counter being connected to supply time data to said multiplexer.

2. The multiplexer interface of claim 1 additionally comprising a clock frequency user input means for selection of a clock frequency connected to supply the clock frequency user input to said clock control means, said clock control means being connected to supply the user selected clock frequency to said time interval counter.

3. The multiplexer interface of claim 2 in which the measured events are laser Doppler velcimeter events.

4. The multiplexer interface of claim 1 in which the measured events are laser Doppler velocimeter events.

5. A multiplexer for interfacing beween a plurality of event measuring channels, each channel generating event data when a measured event occurs on that channel, two or more of said channels being capable of simultaneously generating event data, and a data processing syste which comprise, a plurality of inputs for receiving the event data, one input for each event measured channel, means for performing a coincidence test on the vent data received at said inputs, clock control means connected to for producing time data representative of the time interval between successive events said event data coincidence means a first display means for each of said plurality of measured events connected to receive clock signals from said clock control means for indicating an event data rate, a second display means connected to receive clock signals from said clock control means to indicate a coincidence rate between event data from any selected combination of the measured events, a multiplexer connected to receive the event data from said inputs and said time data from said clock control means and having an output for connection to supply the event data and time data to a single input of the data processing system a control means for multiplexer connected to supply contorl signals to said multiplexer, said multiplexer control means being connected to receive start signals from said event data coincidence means, means for providing user inputs connected to provide the user inputs to said multiplexer control means, said multiplexer control means being configured to be responsive to the inputs from said user input means to select desired outputs from said multiplexer, said event data coincidence means being configured to synchronize three measured events, said second display means being configured to indicate a coincidence rate between the event data for any selected combination of the three measured events and said measured events being laser Doppler velocimeter events.

6. A multiplexer for interfacing between a plurality of event measuring channels, each channel generating event data when a measured event occurs on that channel, two or more of said channels being capable of simultaneously generating event data, and a data processing system which comprises a plurality of inputs for receiving the event data, one input for each event measuring channel, means for performing a coincidence test on the event data received at said inputs, clock control means connected to said event data coincidence means for producing time data representative of the time interval between successive events, a first display means for each of said plurality of measured events connected to receive clock signals from said clock control means for indicating an event data rate, a second display means connected to rec clock signals from said clock control means to indicate a coincidence rate between event data for any selected combination of the measured events, a multiplexer connected to receive the event data from said inputs and said time data from said clock control means and having an output for connection to supply the event data and time data to a single input of the data processing system a control means for said multipexer connected to supply control signals to said multiplexer for selecting the event data and the time data for output from: said multiplexer, said multiplexer control means being connected to receive start signals from said event data conicidence means, means for providing user inputs connected to provide the user inputs to said multiplexer control means, said multiplexer control means being configured to be responsive to the inputs from said user input means to select desired outputs from said multiplexer, said event data coincidence means as being connected to supply an enabling signal to the plurality of event measuring means, said multiplexer control means being connected to supply an inhibit signal to one of the plurality of event measuring means has completed a measurement, said event data coincidence means being connected to supply an inhibit signal to said multiplexer control means, and said event measuring means being laser Doppler velocimeters.

7. A multiplexer for interfacing between a plurality of event measuring channels, each channel generating event data when a measured event occurs on that channel, two or more of said channels being capable of simultaneously generating event data, and a data processing syste which comprises a plurality of inputs for receiving the event data, one input for each event measuring channel, means for performing a coincidence test on the event data received at said inputs, clock control means connecte to said event data coincidence means for producing time data representative of the time interval between successive events, a first display means for each of said plurality of measured events connected to receive clock signals from said clock control means for indicating an event data rate, a second display means connected to receive clock signals from said clock control means to indicate a coincidence rate between event data for any selected combination of the measured events, a multiplexer connected to receive the event data from said inputs and said time data from said clock control means and ahving an output for connection to supply the event data and time data to a single input of the data processing system a control means for said multiplexer connected to supply control signals to said muliplexer for selecting the event data and the time data for output from said multiplexer, said multiplexer control means being connected to receive start signals from said event data coincidence means, means for providing user inputs connected to provide the user inputs to said multiplexer conrol mean said multiplexer conrol means being congigured to be responsive to the inputs from said user input means to select desired outputs from said multiplexer, a status word latch connected to receive measured event status signals from said event data coincidence means, said status word latch being connected to supply status data pulses to said multiplexr, and said measured events being laser Doppler veocimeter events.

8. A multiplexer for interfacing between a plurality of event measuring channels, each channel generating event data when a measured event occurs on that channel, two or more of said channels being capable of simultaneously generating event data, and a data processing syste which comprises a plurality of inputs for receiving the event data, one inpu for each event measuring channel, means for performing a coincidence test on the event data received at saids inputs, clock control means connected to said event data coincidence means for producing time data representative of the time interval between successive events, a first display means for each of said plurality of measured events connected to receive clock signals from said clock control means for indicating an event data rate, a second display means connected to receive clock signals from said clock control means to indicate a coincidence rate between event data for any selected combination of the measured events, a multiplexer connected to receive the event data from said inputs and said time data from said clock control means and having an output for connection to supply the event data and time data to a single input of the data processing system a control means for said multiplexer connected to supply control signals to said multiplexer for selecting the event data and the time data for output from said multiplexer, said multiplexer control means being connected to receive start signals from said event data coicidence means, means for providing user inputs connected to provide the user inputs to said multiplexer control means, said multiplexer control means being configured to be responsive to the inputs from said user input means to select desired outputs from said multiplexer, and said measured events being laser Doppler velocimeter events.

* * * * *